United States Patent
Thompson et al.

(10) Patent No.: US 10,769,412 B2
(45) Date of Patent: Sep. 8, 2020

(54) MUG SHOT ACQUISITION SYSTEM

(76) Inventors: Mark Thompson, North Scituate, MA (US); Robert M. Lupa, Mount Vernon, IL (US); Philip A. Munie, Canton, MI (US)

(*) Notice: Subject to any disclaimer, the term of this patent is extended or adjusted under 35 U.S.C. 154(b) by 746 days.

(21) Appl. No.: 12/782,404

(22) Filed: May 18, 2010

(65) Prior Publication Data
US 2011/0013003 A1    Jan. 20, 2011

Related U.S. Application Data

(60) Provisional application No. 61/216,549, filed on May 18, 2009.

(51) Int. Cl.
*H04N 7/18* (2006.01)
*G06K 9/00* (2006.01)

(52) U.S. Cl.
CPC ................ *G06K 9/00228* (2013.01)

(58) Field of Classification Search
CPC .................................. G06K 9/00228
See application file for complete search history.

(56) References Cited

U.S. PATENT DOCUMENTS

| | | | | |
|---|---|---|---|---|
| 5,161,204 A * | 11/1992 | Hutcheson et al. | ........ | 382/157 |
| 5,642,431 A * | 6/1997 | Poggio et al. | ........ | 382/118 |
| 6,089,715 A * | 7/2000 | Hoover et al. | ........ | 351/221 |
| 6,483,932 B1* | 11/2002 | Martinez et al. | ........ | 382/124 |
| 7,095,880 B2* | 8/2006 | Martinez et al. | ........ | 382/124 |
| 7,466,866 B2* | 12/2008 | Steinberg | ........ | 382/243 |
| 7,657,083 B2* | 2/2010 | Parr et al. | ........ | 382/155 |
| 7,684,651 B2* | 3/2010 | Tang et al. | ........ | 382/305 |
| 7,907,774 B2* | 3/2011 | Parr et al. | ........ | 382/154 |
| 8,041,612 B1* | 10/2011 | Treyz et al. | ........ | 705/27.1 |
| 2002/0122573 A1* | 9/2002 | Eraslan | ........ | G06K 9/00221 382/118 |
| 2003/0091219 A1* | 5/2003 | Martinez et al. | ........ | 382/124 |
| 2004/0003295 A1* | 1/2004 | Elderfield | ........ | G07C 9/00087 713/176 |

(Continued)

OTHER PUBLICATIONS

Quanren Xiong; Jaynes, C.; , "Mugshot database acquisition in video surveillance networks using incremental auto-clustering quality measures," Proceedings. IEEE Conference on Advanced Video and Signal Based Surveillance, 2003. , vol., no., pp. 191-198, Jul. 21-22, 2003; doi: 10.1109/AVSS.2003.1217921; URL: http://ieeexplore.ieee.org/stamp/.*

*Primary Examiner* — Christopher S Kelley
*Assistant Examiner* — Asmamaw G Tarko
(74) *Attorney, Agent, or Firm* — Kristofer E. Elbing

(57) ABSTRACT

A mug shot acquisition system is disclosed that includes an image acquisition interface that is operative to receive digital mug shot images from an imaging device. An image viewing display is responsive to the image acquisition interface and operative to display the received digital mug shot images. One or more standards-based image adjustment software tools allow the digital mug shot images to be adjusted to meet at least one predetermined mug shot image uniformity standard. The system also includes a software interface responsive to requests to initiate one or more operations by the mug shot acquisition system, and an image export interface operative to export digital mug shot images adjusted based on the standards-based image adjustment software.

32 Claims, 17 Drawing Sheets

(56) References Cited

U.S. PATENT DOCUMENTS

| | | | |
|---|---|---|---|
| 2004/0024694 A1* | 2/2004 | Lawrence | G06Q 20/10 705/38 |
| 2004/0117638 A1* | 6/2004 | Monroe | 713/186 |
| 2004/0133582 A1* | 7/2004 | Howard et al. | 707/100 |
| 2005/0108282 A1* | 5/2005 | Venkatachalam | 707/104.1 |
| 2005/0203353 A1* | 9/2005 | Ma et al. | 600/315 |
| 2006/0067573 A1* | 3/2006 | Parr et al. | 382/154 |
| 2007/0179918 A1* | 8/2007 | Heisele et al. | 706/13 |
| 2007/0183633 A1* | 8/2007 | Hoffmann | 382/116 |
| 2007/0242138 A1* | 10/2007 | Manico et al. | 348/231.3 |
| 2010/0033677 A1* | 2/2010 | Jelinek | 351/208 |
| 2010/0111377 A1* | 5/2010 | Monroe | 382/118 |
| 2010/0321183 A1* | 12/2010 | Donovan et al. | 340/540 |
| 2011/0128385 A1* | 6/2011 | Bedros et al. | 348/164 |
| 2011/0292181 A1* | 12/2011 | Acharya et al. | 348/47 |
| 2012/0005048 A1* | 1/2012 | Treyz et al. | 705/27.2 |
| 2012/0027268 A1* | 2/2012 | Kwan | 382/118 |
| 2012/0133816 A1* | 5/2012 | Imai | 348/333.03 |
| 2012/0176495 A1* | 7/2012 | De Mers et al. | 348/143 |
| 2013/0251215 A1* | 9/2013 | Coons | 382/118 |

* cited by examiner

MUG SHOT ACQUISITION SYSTEM

CROSS-REFERENCE TO RELATED APPLICATIONS

This application claims the benefit of provisional application No. 61/216,549, which was filed May 18, 2009 and entitled MUG SHOT ACQUISITION SYSTEM, and which is herein incorporated by reference.

FIELD OF THE INVENTION

This invention relates to computerized systems for law enforcement, such as mug shot acquisition systems.

BACKGROUND OF THE INVENTION

Digital cameras are now widely used in acquiring mug shots and other photographic evidence. The digitally formatted images that these systems provide can easily be transferred between local law enforcement offices or to centralized mug shot databases. To allow for uniform line-ups and to improve results of automatic facial recognition processing, uniform standards for a mug shots have been developed. In the US, the National Institute of Standards and Technology (NIST) has developed a set of best practices recommendations for the capture of mug shots, and version 2.0 of these recommendations is herein incorporated by reference.

SUMMARY OF THE INVENTION

A mug shot acquisition system is disclosed that includes an image acquisition interface that is operative to receive digital mug shot images from an imaging device. An image viewing display is responsive to the image acquisition interface and operative to display the received digital mug shot images. One or more standards-based image adjustment software tools allow the digital mug shot images to be adjusted to meet at least one predetermined mug shot image uniformity standard. The system also includes a software interface responsive to requests to initiate one or more operations by the mug shot acquisition system, and an image export interface operative to export digital mug shot images adjusted based on the standards-based image adjustment software.

In preferred embodiments, the system can further include storage for machine-readable standards with the standards based-image adjustment software tools including at least one tool that automatically applies a standard. The standards-based image adjustment software tools can include standards compliance display indicators that are operative to indicate a degree of compliance of an image with at least one predetermined standard. The standards-based image adjustment software tool can include a background calibration tool operative to apply at least one predetermined standard to a background against which a digital mug shot image is to be acquired. The background calibration tool can be operative to evaluate a background for uniformity of illumination against a predetermined standard for uniformity of illumination and can be operative to present an indication of compliance to the standard to the user. The background calibration tool can be operative to provide at least one spatial indicator to convey spatial information about non-uniformity of illumination. The background calibration tool can be operative to apply at least one predetermined image color content standard to the digital mug shot images. The standards-based image adjustment software can be operative to apply at least one predetermined pixel-size standard to the digital mug shot images. The standards-based image adjustment software tools can include an exposure validation tool operative to validate an exposure level for at least one digital mug shot image according to a predetermined standard. The exposure validation tool can be operative to detect hot spots and shadows. The standards-based image adjustment software tools can include a framing tool. The framing tool can provide automated assistance to a system user in framing the face, head, and shoulders according to a predetermined standard. The framing tool can be operative to provide at least one on-screen movable image alignment reference that is operative to be displayed in the display at the same time as is a digital mug shot image. The framing tool can include automatic subject tracking logic operative to automatically position the at least on reference relative to at least one anatomical feature of the mug shot subject. The framing tool can include manual guide positioning logic responsive to user input to manually position the at least one reference relative to the at least one anatomical feature of the mug shot subject. The framing tool can be operative to provide references for a width, a horizontal mid-point, and an eye level of a subject face. The image acquisition interface can be a universal interface that is operative to acquire digital mug shot images from different types of image sources. The image acquisition interface can be operative to interface with still image cameras and video cameras. The image acquisition interface can be operative to convey an acquisition triggering control to the image source while an image received from the interface is being displayed on the display. The display can include a window in a larger display device associated with a general-purpose computer. The standards-based image adjustment software tools can include a depth-of-field validation tool operative to apply a predetermined depth of field standard to the digital mug shot images. The image acquisition interface can be responsive to one or more image acquisition controls displayed in the display. The image acquisition interface can be a digital camera interface and can include a digital camera cable with the system further including a digital camera mount within range of the digital camera cable. The system can further include user interface logic operative to display a pose selection control, a capture control, and a camera window in the display. The user interface logic can be further operative to display a thumbnail icon area that presents icons that each correspond to different types of mug shot images. The software interface can be responsive to a launch command to launch the mug shot acquisition system. The software interface can be responsive to the launch command together with at least one parameter. The software interface can be constructed to allow a transfer of control that does not provide any significant cue that different programs are being used. The software interface can be constructed to allow a transfer of control from a records management system.

In another general aspect, the invention features a mug shot acquisition system that includes means for receiving digital mug shot images from an imaging device, means for displaying the received digital mug shot images, and standards-based image adjustment means for allowing the digital mug shot images to be adjusted to meet at least one predetermined mug shot image uniformity standard. It also includes means responsive to software requests to initiate one or more operations by the mug shot acquisition system, and means for exporting digital mug shot images adjusted based on the standards-based image adjustment means.

Systems according to the invention can allow for seamless integration of mug shot capture into a law enforcement office's computer systems. This benefit can result from providing a mug shot capture system with a standardized software interface that allows it to be easily called by another law enforcement application. The result is that a law enforcement office can select a customized suite of law enforcement computer applications that is tailored to its specific needs, without sacrificing ease of use in daily operating situations.

DETAILED DESCRIPTION OF AN ILLUSTRATIVE EMBODIMENT

Figure 1:
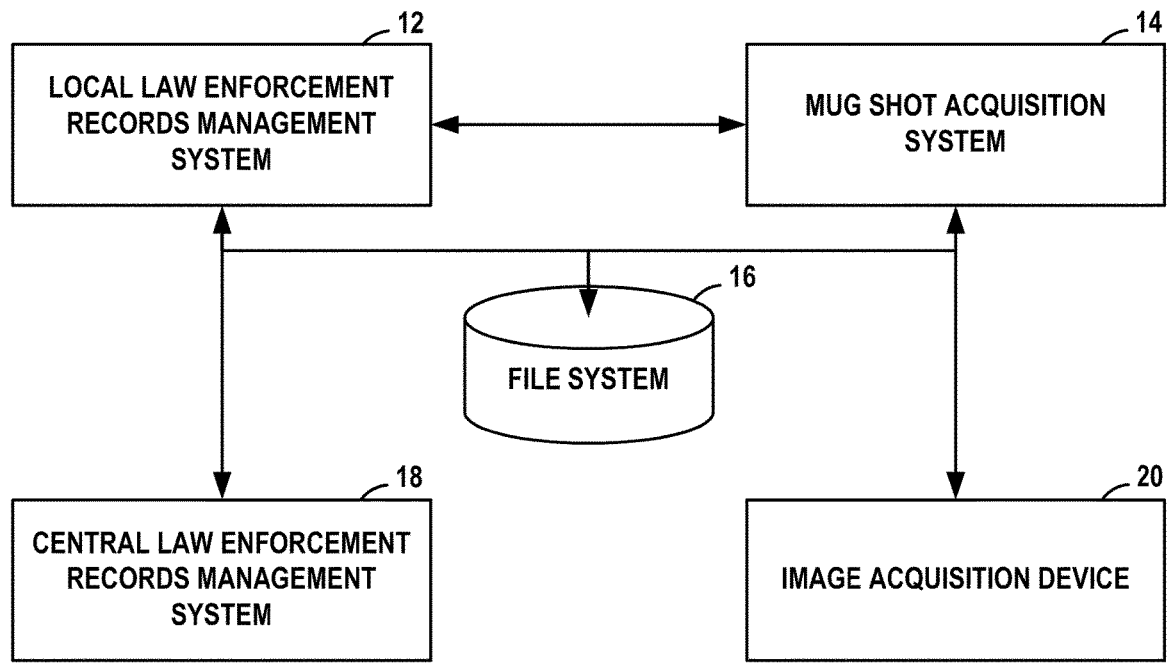
FIG. 1 is a block diagram of an illustrative mug shot acquisition and sharing system according to the invention.

Referring to FIG. 1, an illustrative mug shot acquisition system 10 according to the invention can include a local law enforcement application, such as a records management system 12, and a mug shot acquisition system 14. The mug shot acquisition system can include an acquisition device interface that can connect to an image acquisition device 20. Preferably, the acquisition interface can be a universal digital camera interface that can control, and receive images from, a variety of different types of video and still digital cameras, such as through a Universal Serial Bus (USB) port.

The local law enforcement records management system 12 interacts with the mug shot acquisition system 14 through a software interface, such as a dynamic Application Programming Interface (API). The local law enforcement records management system and the mug shot acquisition system each also interact with storage, such as a file system or database 16. This allows the mug shot acquisition system to save images in a place where other programs, such as the local law enforcement records management system, can access them. One or more programs, such as the local law enforcement records management system can also access a central law enforcement records management system 18 for sharing evidence including fingerprints and mug shots. The term "local" in this application is intended to contrast with the term "central" in illustrating the sharing of mug shots, and is not intended to indicate that the acquisition system is to be used only by law enforcement organizations of any particular type or size.

Figure 2:
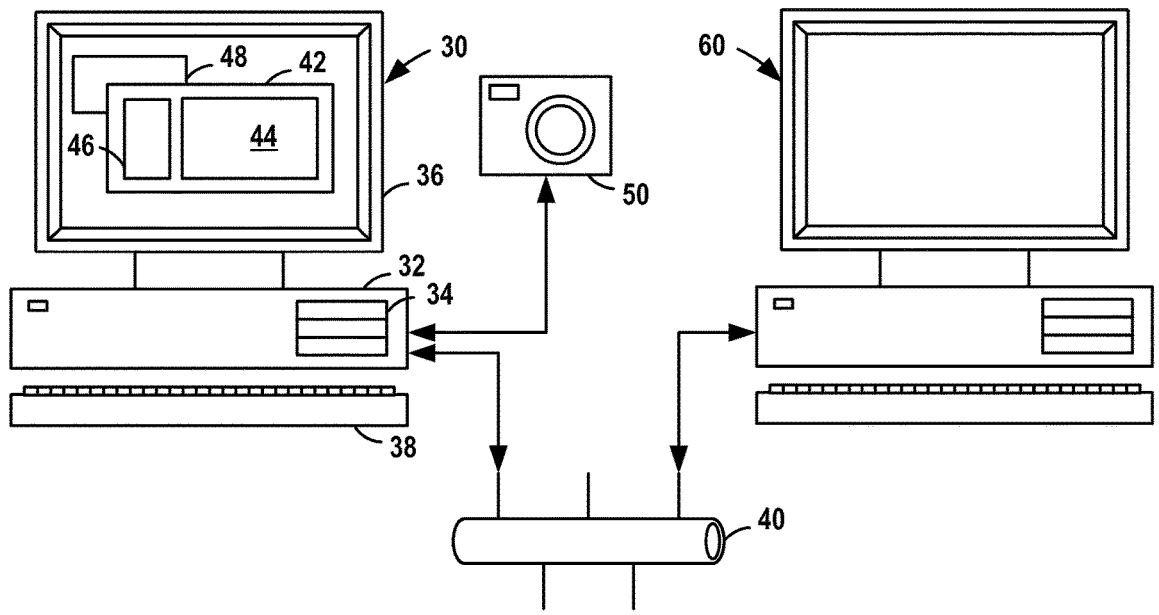
FIG. 2 is a block diagram of an illustrative implementation of the system of FIG. 1.

Referring to FIG. 2, one embodiment 10A of the illustrative mug shot system 10 is implemented using standard Microsoft Windows®-based workstations 30, 60. The first workstation 30 includes local software, such as the law enforcement records management system 12 and the mug shot acquisition system 14. As is well known, the workstation can include a processing system 32, and storage 34, such as semiconductor or disk storage. The workstation can also include a display device 36 and one or more user input devices, such as a keyboard 38.

The mug shot acquisition system 14 can present its user interface, which can include controls 46 and an imaging display area 44 in an operating system window 42. Other programs, such as the local law enforcement records management system can also present their user interfaces through other operating system windows (e.g., 48). The different windows may or may not be displayed simultaneously.

The processing system 32 can provide a physical interface to an image acquisition device, such as a digital camera 50. This physical interface can include an electrical connector, a wireless link, or any other suitable communication channel. This physical interface preferably provides bidirectional communications between the workstation and the camera, to allow for control of the camera and acquisition of images.

The processing system 32 can also include a network communications interface, such as a network card that can be connected to a network 40. This interface can allow the local workstation 30 to communicate with remote workstations (e.g., 60) to share images and other law-enforcement data.

While the illustrative embodiment of the invention disclosed in connection with special-purpose software operating in connection with a processor on a Microsoft Windows®-based platform, one of ordinary skill in the art would of course recognize that the system could also be implemented using other types of general-purpose computer platforms, dedicated hardware, or a combination of the two. And while the presently preferred embodiments are presented in connection with the illustrated block diagrams and flowcharts, other breakdowns are also possible.

Figure 3:
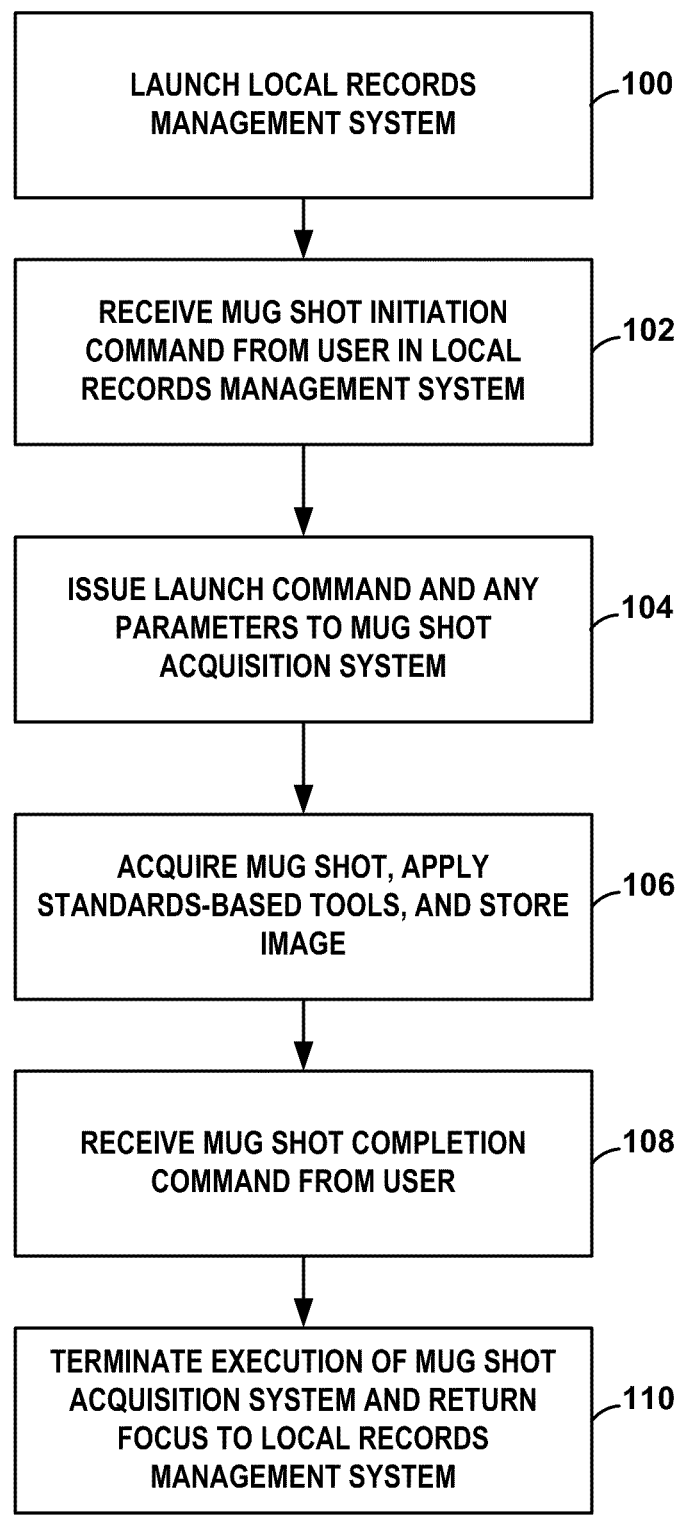
FIG. 3 is a flow chart that illustrates operations of the illustrative mug shot acquisition system of FIG. 1.

In operation, referring to FIG. 3, the mug shot acquisition system 10 can be called by another program, such as the local law enforcement records management system 12. This process can begin with the launching of a local records management system, such as at workstation boot-time (step 100). A system user can then perform various operations with the records management system until he or she is ready to take one or more mug shots, which is typically done in connection with the creation of a new arrest record in the local records management system. At this time, the user can simply issue a mug shot initiation command from within the local records management system (see step 102), such as by clicking on a link or button in the local records management system. This action will cause the local records management system to issue a launch command, which may be associated with one or more launch parameters, to the mug shot acquisition system (step 104). In one embodiment, this is a simple shell call with command line parameters.

Once the mug shot acquisition system 14 has been launched, the user will be able to acquire images and apply uniformity standards to them (step 106). The software interface allows the control from one program to the other to occur seamlessly, and the user may not even know that different functions are being provided by different programs. Once the user has completed the mug shot acquisition session, he or she can issue a mug shot completion command (see step 108), such as by actuating a "close" button. This can cause the mug shot acquisition system to terminate execution and return focus to the local records management system (step 110). This return of control can also be seamless and result in the impression that a single program is being used.

Figure 4:
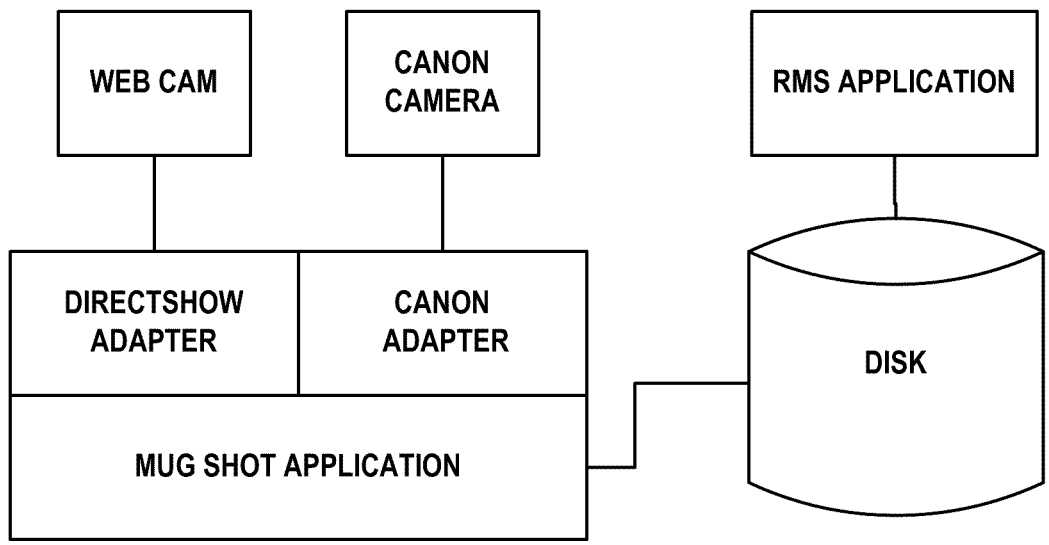
FIG. 4 is a block diagram of an illustrative mug shot acquisition system used in the illustrative mug shot acquisition and sharing system of FIG. 1.

Referring to FIG. 4, operations of an illustrative mug shot acquisition system designed to assist law enforcement in capturing NIST compliant mug shots will now be described in more detail. This system uses cameras which comply with standard imaging programming interfaces (e.g., Windows Image Acquisition) and provide a simultaneous live video feed. Users of the system will be able to calibrate the camera settings in order to target NIST specifications for mug shot photographs as closely as possible. When a subject is being registered with the system the operator has the ability to maintain the proper sizing and framing on the live video to allow compliant images to be taken. The images can be saved to disk allowing for easy integration into the police records management systems (RMS). Additionally, the system is architected to allow hardware upgrade and changeover with a minimum of difficulty.

The system is based on a software application that provides image capture and storage front-end capability for use by law enforcement officers. A commercial, off-the-shelf (COTS) digital camera is used to capture the image. The system uses a pluggable camera module approach to isolate the camera hardware selection from the main application. Still image digital, web cam, DV or industrial camera modules may be developed to support market need. Initially Microsoft DirectShow and Canon-specific modules were developed, although other standards and brands can of course be supported. The application provides an easy-to-use interface for previewing, capturing and managing a mug shot acquisition session and then stores the images in a convenient location for import into the existing RMS application.

Figure 5:
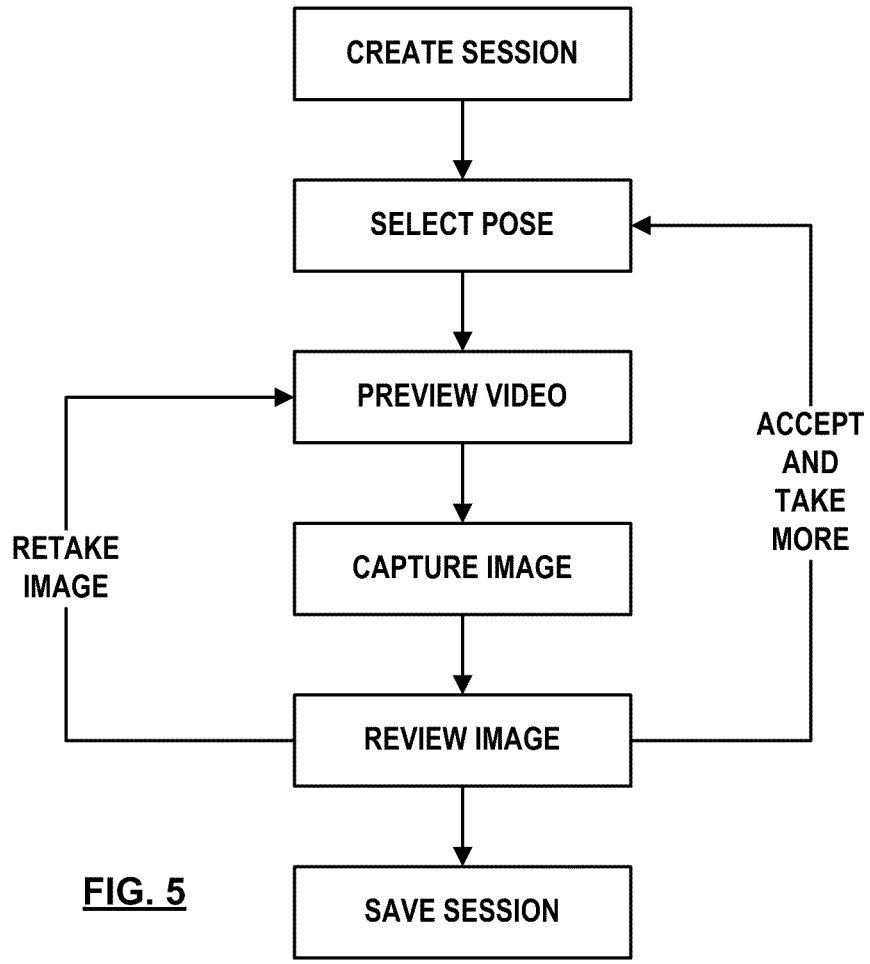
FIG. 5 is a flowchart illustrating the primary application flow for an illustrative mug shot application used in the illustrative mug shot acquisition system of FIG. 4.

The primary application flow is outlined in FIG. 5. This flow allows for a session to be created and a number of selected poses to be previewed, captured, reviewed and, once completed, stored on disk. Additional flows are detailed in this document for camera calibration, new camera setup and pose set management.

Each time mug shot images are required for a new arrestee, a session should be created. A session can be thought of as the container for all the images that are captured for a particular arrestee. To make each session unique, a time stamp will be associated with it. When all the captured images within the session have been reviewed they can be exported to an output directory which will be identified by the unique session ID.

To make sure each session is unique, a time stamp will be associated with the session as the unique identifier. The time stamp will reflect when the session was created. Uniqueness is used to reinforce the idea that a session is a container for captured images of one arrestee at a particular time. The session identifier is used as the default name of the session; however the session name can be edited to allow the user to create a customized identifier for the session.

Common predefined poses are available within the session, such as frontal, left profile, etc. Predefined poses have varying degrees of automated and assistive options for analyzing and validating the image. In short, manual cropping and validation will require the user to completely validate that the image meets the requirements of the pose while assisted validation and cropping will assist the user in selecting the appropriate region of the image and validate the requirements automatically.

Figure 6:
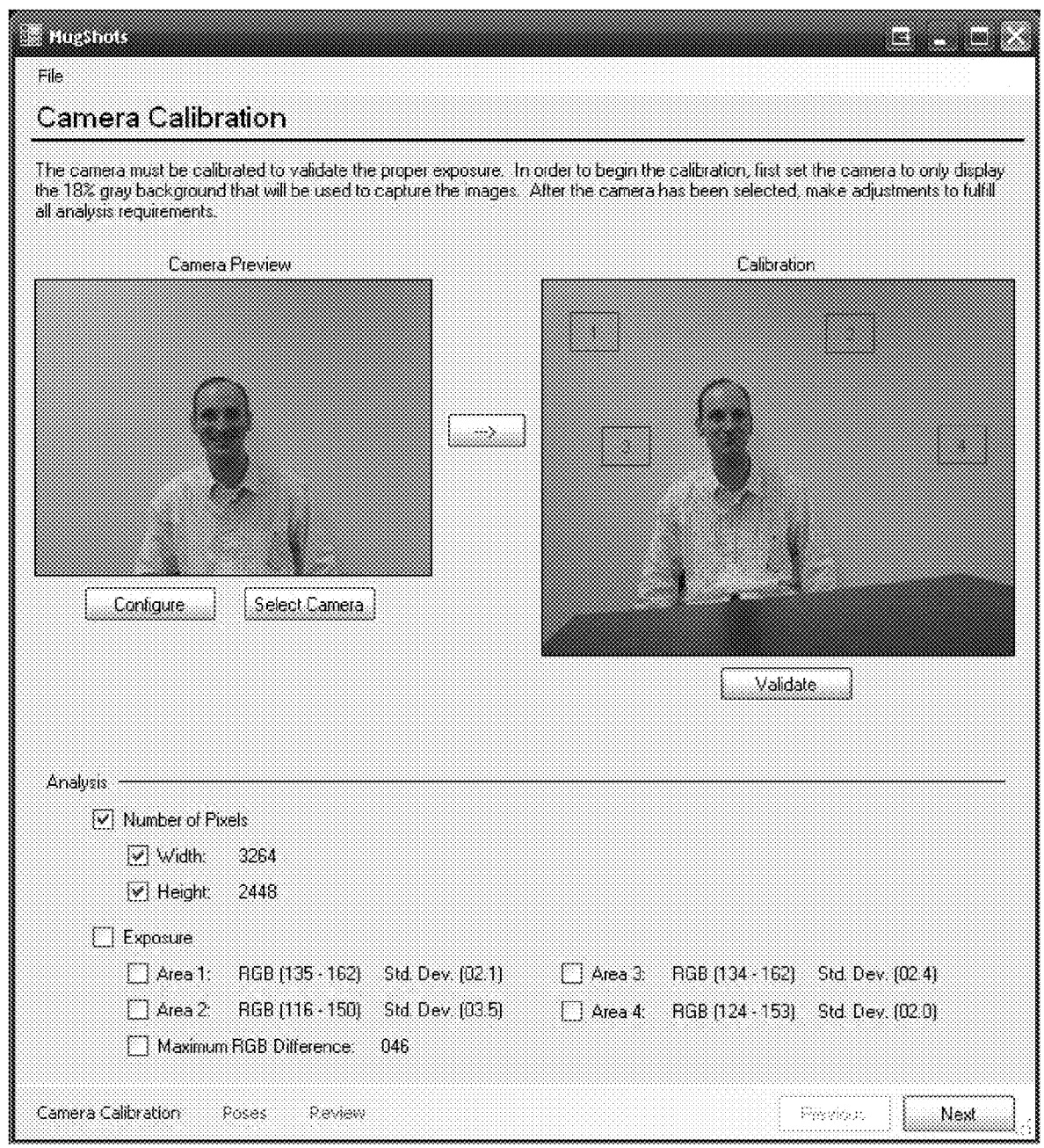
FIG. 6 is a screenshot of an illustrative camera calibration dialog for the illustrative mug shot acquisition system of FIG. 4.

Referring to FIG. 6, before capturing images, the camera used to capture those images is first selected and then calibrated. In this sense, calibration will consist of adjusting the settings to make sure the camera is equipped to capture a valid mug shot.

The first part of camera calibration is to select the camera that will be used. In cases where more than one camera is in use, the user will have to select which camera they wish to use for capturing the images. Once the camera is selected the user may set camera-specific settings using the configure button on the calibration page. These settings will be retained between sessions.

Once a camera has been selected, the application will check to make sure that it can capture the minimum number of pixels required for a valid image. The standard states that the image must be at least 480×600 (width×height) pixels. If the camera does not support such output, it will not be permitted to capture images. It is intended that the software use the maximum resolution possible for capturing images. A reasonable upper limit may also be defined to provide reasonable execution performance.

Validating the exposure is keyed to the background. To begin, the background is needed, which must be 18% gray with a plain smooth flat surface. Validation will start by the user positioning the background image and the camera in their expected locations. The camera should be set up as if taking a captured image, although the validation is specific to the background exposure, ideally an individual would be in the image to allow focus and balance on the camera to function correctly. Several areas of the camera image where only the background exists will be examined with the following requirements in mind:

The average of the RGB components within each area should be calculated. Each of the RGB means should fall between 105 and 125, with a standard deviation of plus or minus 10.

The maximum difference between the means of any two of the RGB components should not exceed 10.

The exposure will only be validated when all of the requirements above are met. Test captures from the camera will be made to validate the settings. The camera settings, lighting, and/or the background may need to be adjusted in order to fulfill these requirements. The validation process will provide feedback as to the issues encountered while trying to validate the test images. The user may manually override the exposure validation process to allow sessions to proceed but the resulting images may not meet NIST requirements for proper mug shot photos.

To adjust the camera, a number of camera settings will be configurable, for example, a camera may support options such as:

Digital Zoom
Sharpness
Contrast
White Balance
Exposure

The exact list will depend on the capabilities of the camera. These settings may be adjusted to help meet the requirements for exposure validation.

Once the camera has been calibrated, the user will be allowed to capture any number of selected poses (it is not required to recalibrate the camera before every use although periodic recalibration or recalibration when the setup is changed or lighting conditions are altered is recommended). The user will first have to select which pose they are trying to capture. There exists common predefined poses, such as frontal, left profile, etc (the set of predefined poses (the pose set) will be specified in a configuration file).

Figure 7:
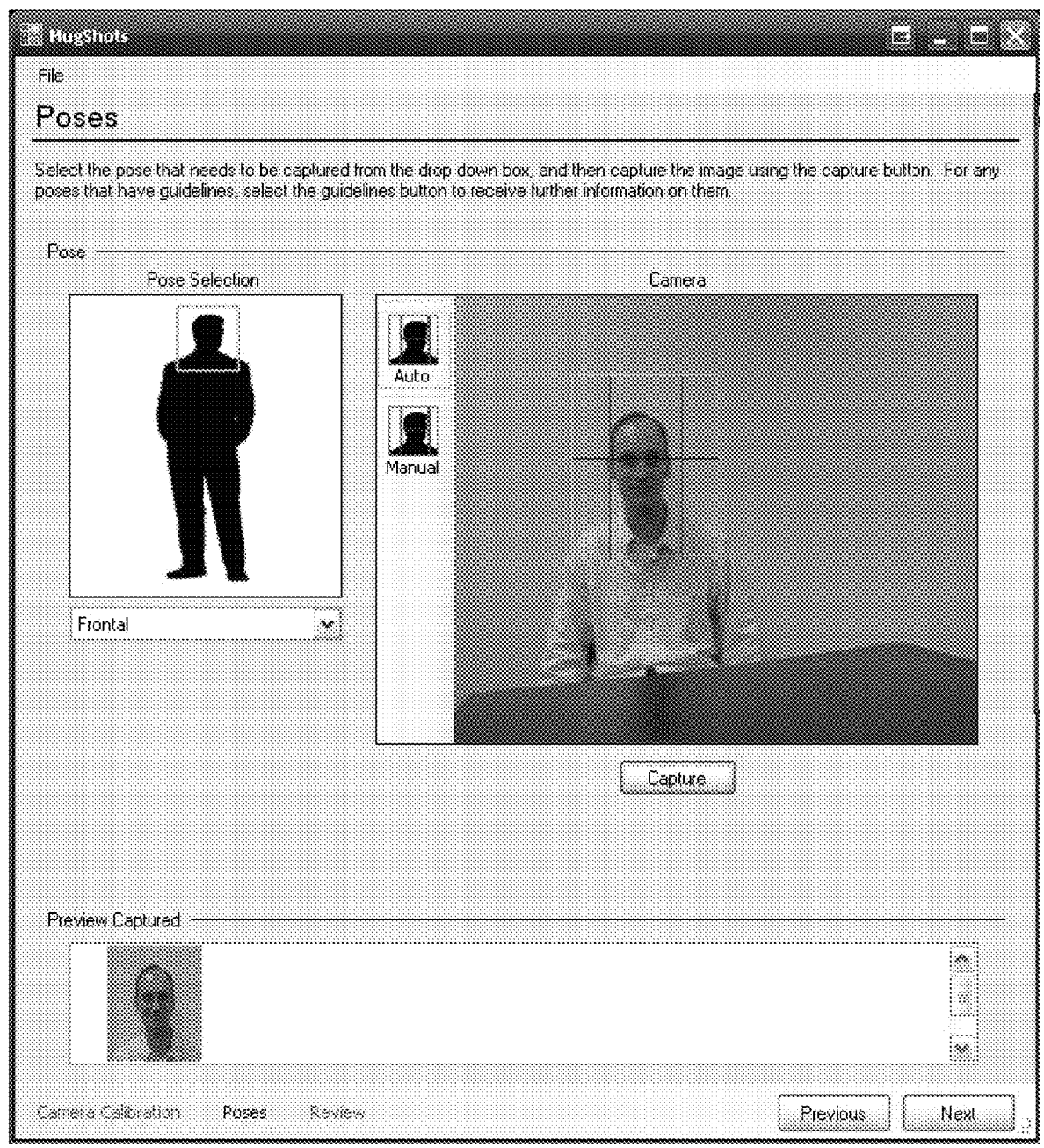
FIG. 7 is a screenshot of an illustrative pose selection dialog for the illustrative mug shot acquisition system of FIG. 4.
Figure 8:
FIG. 8 shows a series of copies of the same mug shot image illustrating steps taken to crop the image using the illustrative mug shot acquisition system of FIG. 4.

Referring to FIG. 7, selection of a pose will now be discussed. Before an image can be captured, the pose that is being taken must be selected. This provides several important features:

Determines the type of validation used for the pose.
Default image filename is partially made up of the pose description Some poses have specific requirements for the final image. These requirements can sometimes be difficult to validate, where possible automation will be implemented.

Some opportunities for assistive automation are:
Automatic exposure validation after capture
Automated suggestion of eye-line center
Automated suggestion of head boundaries
Post processing for exposure correction When taking a captured image of the frontal pose for example, the user will need to adjust the eye-center line and the left and right bounding lines of the head to make sure the alignment is correct before capturing the image. Appropriate sizing and cropping will be performed using these reference lines.

In addition, when the images are first captured, the default name given to them includes the pose description. The pose description is used to help the user differentiate between captured images that have not been renamed by the user. In essence, it provides some minimal contextual association for each image captured.

Referring to FIGS. 8A-F In certain poses, automation is an option for validating the camera image. Typically, these poses have specific requirements as to how the image should look. The requirements can sometimes be difficult to validate, and therefore automation will be implemented to reduce the difficulty. In general terms, the user will have to select a pose-specific bounding area, and the camera image will be cropped automatically to match the requirements of that pose. This will assure the captured image is valid, with minimal adjustments to the camera. In the event that a valid captured image isn't possible because of the position of the specified bounding area, the user will not be able to proceed to the capture step until the indicated problems are addressed.

As an example, the frontal pose has requirements based upon the position of the head. Therefore, the user will have to select the bounding area of the head and the application will automatically crop the image into a valid state, if possible. The basic steps in front pose cropping are shown in FIGS. 8A-F.

The first step in processing a front pose is to determine the eye line center. If this can be automatically determined, it will be used as the default position, if it cannot be determined the calibration default will be used. The user may adjust the position of the eye-line as necessary. The left and right boundaries of the head will be determined if possible (automatically if possible or through default positions relative to the eye-center line). From these three values the bounding box of the final image can be determined. If the bounding box lies outside the image the user will be prompted to correct the problem (for example, by centering the subject in the field of view, adjusting the distance to the subject or changing the zoom level of the camera).

Side views will use the default positions for the left, right and eye-center positions. Automated face boundary is not be supported in this embodiment. Some automated gross localization may be added based on available time and estimated level-of-effort at the discretion of the implementation team. There are no hard specifications for the left and right profile views, but it is expected that the same rules for the front view (bounding left and right sides of head and position eye-center line) will be used to achieve similarly proportioned images.

Figure 9:
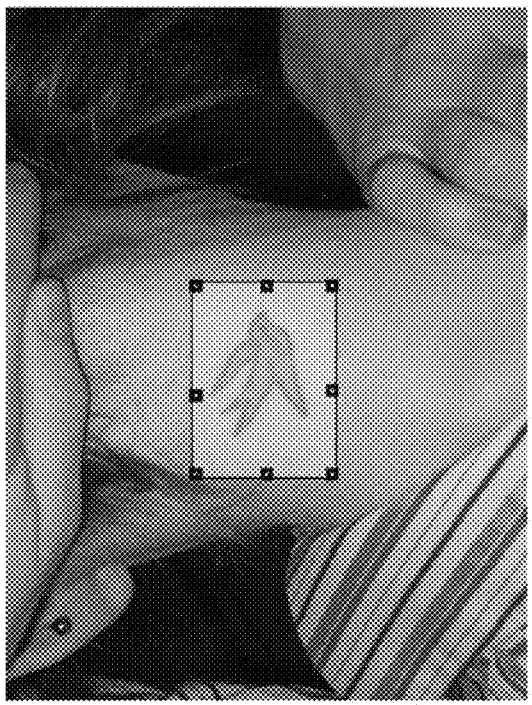
FIG. 9 shows a series of copies of the same image of a subject's tattoo that illustrates steps taken to crop the image around the tattoo using the illustrative mug shot acquisition system of FIG. 4.
Figure 9:
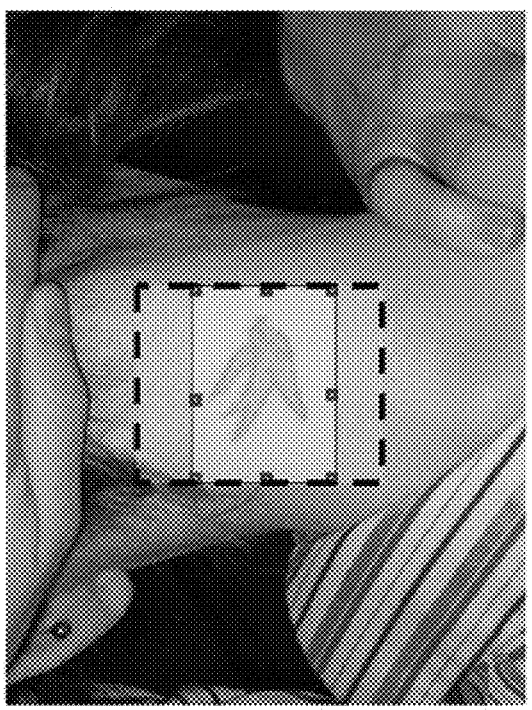
Figure 9:

In poses where automation isn't supported and there are not pre-determined rules for image validity, the user will have to use manual cropping and validation. This type of validation leaves the user completely responsible for taking a valid, consistent captured image of the selected pose. The only type of automation which will occur in this mode is to make sure that the captured image has an aspect ratio which is consistent other poses. This is done by extending the bounding rectangle to meet the aspect ratio requirements. An example of this is shown in FIG. 9.

When the camera image has been validated for the selected pose, either by assisted validation or manual validation, it will then be possible to capture the image. After the image has been captured, it will be stored in the current session. All images will be stored in memory in the current session until the user exports them to the destination directory.

Figure 10:
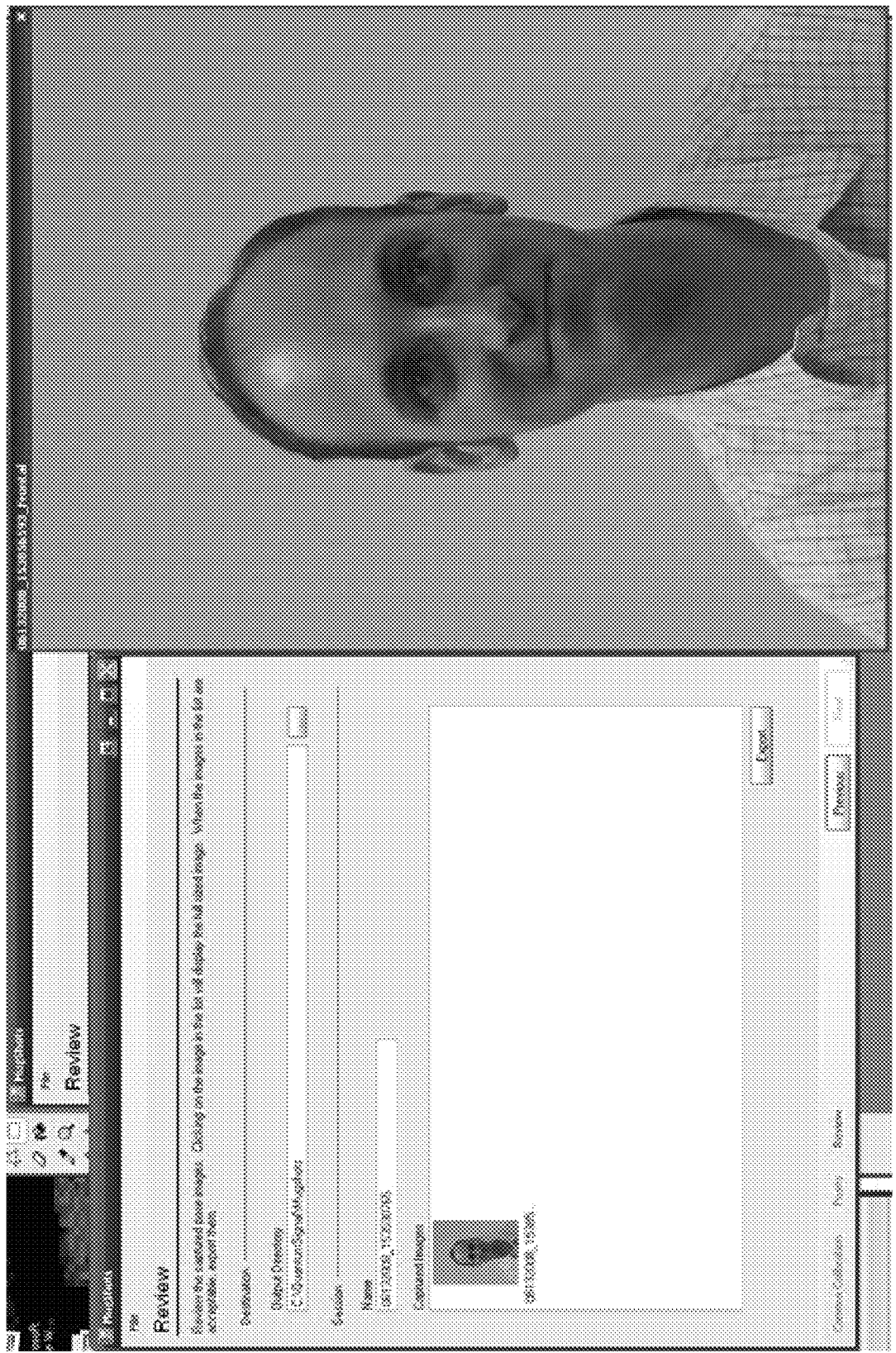
FIG. 10 is a screenshot of an illustrative review dialog for the illustrative mug shot acquisition system of FIG. 4.

Referring to FIG. 10, the user has the ability to evaluate any image that has been captured. They will be able to view the captured images in a downsized format, or enlarge each of the images to full scale. At the point of evaluation, they can decide to keep the image, rename the image, or completely dispose of the image. It is intended that all captured images be evaluated before deciding to export them.

Figure 11:
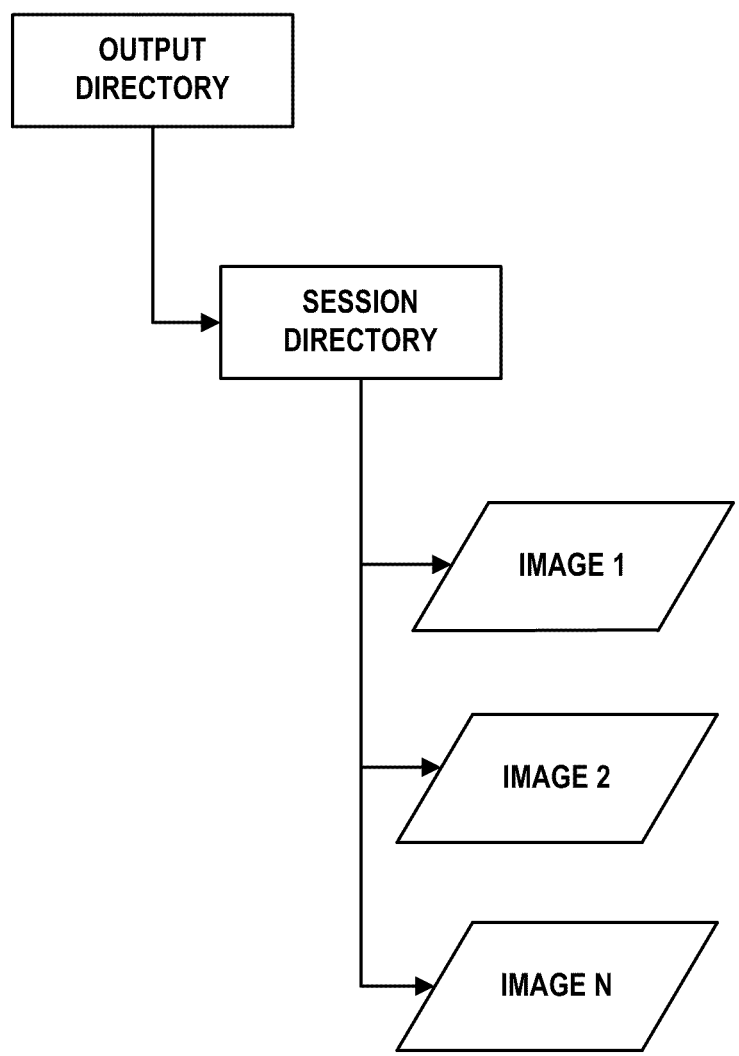
FIG. 11 is a block diagram of an illustrative directory structure for use with the illustrative mug shot acquisition system of FIG. 4.

When all captured images have been evaluated, which means the remaining images in the session are desired, they can be exported. The directory structure for the exported images will resemble FIG. 11. The output directory will be the location where the session will be exported to. Within the output directory, a directory will be created with the session name, and that directory will contain all the images that have been captured for that particular session.

The user has the ability to configure the directories in which the captured images go into, as well as renaming the session and individual images within that session to help associate them more easily. The user can set a default output directory. The output directory refers to the location where all the session directories will be placed. Once the output directory has initially been set, the application will remember the previous destination and set that as the default. The user has the option to change the output directory at any time.

Session directories are also created. When a session is created, it is supplied with a unique default name. The uniqueness is implemented by naming it with the current timestamp. The format for the initial name is as follows: "[date]_[time]". If the session was to be exported with the default name, the session would create a directory with the timestamp as its name. Like the output directory, the user can change this session name at any time. In cases where the user would want the directory to be more associated with its content, changing the name would be a viable option. The software installation and upgrade procedures will use common installation methods via Windows installer.

Table 1 lists an illustrative set of requirements for the illustrative system.

TABLE 1

| No. | Description |
|---|---|
| | I. MUG SHOT VALIDITY |
| | *Poses* |
| 1 | Frontal (full-face) pose must be captured. |
| 2 | No eyeglasses may be worn for mandatory poses. |
| 3 | If only one profile pose is captured, it must be the left profile. |
| | *Depth of Field* |
| 4 | Captured facial image should always be in focus from the nose to the ears. |
| | *Centering* |
| 5 | Frontal pose should be positioned so the following criteria are satisfied:<br>1) Approximate horizontal mid-points of the mouth and of the bridge of the nose should lie on an imaginary vertical straight line positioned at the horizontal center of the image.<br>2) An imaginary horizontal line through the center of the subject's eyes should be located at approximately the 55% point of the vertical distance up from the bottom edge of the captured image.<br>3) The width of the subject's head should occupy approximately 50% of the width of the image. This width should be the horizontal distance between the mid-points of two imaginary vertical lines. Each imaginary line should be drawn between the upper and lower lobes of each ear and should be positioned where the external ear connects to the head. |
| | *Lighting* |
| 6 | Minimization of shadows should take place. |
| 6 | Eliminate hot spots (reflective areas such as cheeks and foreheads). |
| | *Background* |
| 7 | Background must be 18% gray with a plain smooth flat surface. |
| | *Exposure* |
| 8 | Exposure should be keyed to the background. |
| 9 | Several areas of the recorded 18% gray background should be used to verify the proper exposure. |
| 10 | Averages of the 8-bit Red, Green, and Blue (RGB) components within each area should be calculated. |
| 11 | Each of the RGB means should fall between 105 and 125, with a standard deviation of plus or minus 10. |
| 12 | The maximum difference between the means of any two of the RGB components should not exceed 10. |
| | *Aspect Ratio* |
| 13 | The width-to-height aspect ratio of the captured image should be 1:1.25. |
| | *Pixels* |
| 14 | The minimum number of pixels for the image (width × height) is 480 × 600. |
| 15 | The captured images should use square pixels with a pixel ratio of 1:1. |
| | *Save Images* |
| 16 | Digital images must be represented as a 24-bit RGB image (Red = 8 bits, Green = 8 bits, Blue = 8 bits). |
| 17 | Algorithm used to compress images should conform to the JPEG Sequential Baseline mode. |
| 18 | Target size for a JPEG compressed color image file should be between 25,000 and 45,000 bytes. |
| 19 | JPEG File Interchange Format (JFIF) should contain the JPEG compressed image data. |

TABLE 1-continued

No. Description

II. APPLICATION
Main Form User Interface

20  User should be able to restart the session at any time.
21  The status strip should always remind the user what stage they are on, with the current stage enabled and colored.
22  When the user has completed the requirements for a stage, they should be allowed to continue to the next stage.
23  The user should always be able to return to a previous stage.
24  The user should be able to change the output directory.
25  The user should be able to change the session name.

Camera Calibration Control User Interface

26  User must select the camera, and begin capturing video from it before analyzing the background.
27  Once the camera has been selected, the user should calibrate the camera until the exposure (based on previous requirements: 8-12), and pixels (requirements: 14-15) are valid.
28  The user should be able to adjust camera settings that are used in WIA (Windows Imaging Architecture) to meet the exposure validation.
29  Stage completion requires:
    Camera selected
    Exposure validated
    Pixels validated

Poses Control User Interface

30  The user must select the proper pose to capture.
31  After a pose has been selected, the capturing process should allow for virtual camera positioning. Essentially, the user has the ability to scale (closer or farther), and transform (left, right, up, or down) the camera image.
32  For automated validation, guidelines should be used to define the pose-specific bounding area. These guidelines are set by the user, and allow the camera image to be cropped automatically so they match the requirements of the pose and are therefore validated.
33  For the frontal pose, the head is the specified bounding area. The guidelines should be made up of the following:
    1) Eye-line center
    2) Head boundaries
    Each of the guidelines should be able to be selected and then the user will click on the camera image to set the location of the selected guideline. The guidelines should be drawn on top of the camera image.
34  For manual validation, the user will have to be completely responsible for taking a valid captured image of the selected pose. The user will have the ability to use virtual camera positioning, or physical positioning of the camera, to capture the pose.
35  When the pose in the camera image has been validated (by automation or manually), capturing should be enabled. Otherwise, it should be disabled.
36  The captured image will automatically be stored in the session once the image has been captured and should be displayed for viewing. The user can then evaluate the captured image and decide if they want to keep it or retake it.
37  The user should be able to rename or delete any of the captured images.
38  User should be able to easily see all of the captured images at once, and each should be labeled with their respective names.
39  Stage completion requires:
    Valid frontal pose captured.

Review Control User Interface

40  The user should be presented with a review of all the captured images.
41  The user should be able to export the captured images.
42  Exported images should use the following directory structure: [Output directory]/[Session name]/[Image name].
    The session will create a directory with its name inside of the output directory.
    The session directory will contain all the images.

Figure 12:
FIG. 12 is a screenshot of a pose selection dialog in use for acquiring an image of a tattoo with the illustrative mug shot acquisition system of FIG. 4.

The application can provide different ways to obtain images of areas of interest, such as scars or marks. Referring to FIG. 12, one approach is to allow an operator to use a selection box to attempt to finely frame a space around the area of interest. Using this mode of selection may make it difficult to properly frame the region of interest, especially if the area is small or does not properly fit within the bounded aspect ratio required by the application.

Figure 13:
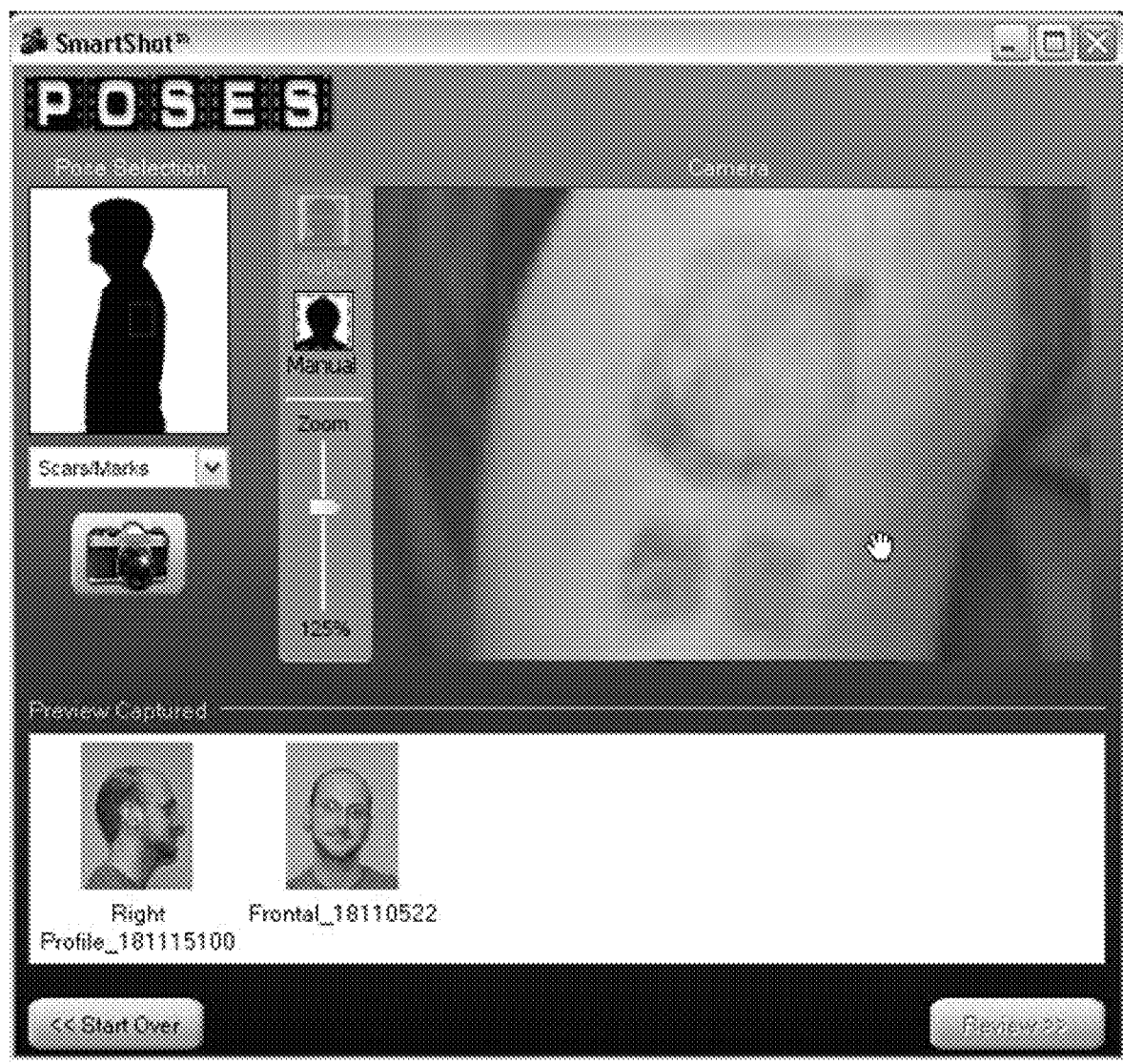
FIG. 13 is a screenshot of a pose selection dialog equipped with a zoom control in use for acquiring an image of a tattoo with the illustrative mug shot acquisition system of FIG. 4.

Referring to FIG. 13, another approach includes providing another mode of operation during the session capture process. This mode can be identified as "Scars/Marks" and allows the user to zoom in/out on the preview video, which will grow/shrink to fill the entire preview area. The zoom control can cause the camera to adjust its optical zoom, or the zooming can be performed digitally, such as in the case where zoom controls are not available through the camera interface.

Figure 14:
FIG. 14 is a screenshot of a review screen showing an image of a tattoo obtained using the pose selection dialog of FIG. 13.

Zooming can be controlled through the use of a slider, which can be located on the left-hand side of the preview area or using mouse/cursor combinations. The user may pan the viewable area by clicking and dragging with the mouse. An option for immediately previewing in a scale-to-fit preview window can also be made available as desired to verify the contents of the captured image, as shown in FIG. 14. This can be useful for small scars/marks. The user will be able to view the captured image in a full-size (if screen space allowed) preview similar (preferably nearly identical) to what is displayed in the review screen. As the scar/mark is more detail-sensitive this may be of importance to the user. This is significant because the live preview that has been zoomed and/or panned can be of significantly lower resolution compared to when the image is actually captured, therefore the scar/mark/tattoo may appear pixelated during live preview (if digital zooming was used). This will ensure that the user has captured sufficient fidelity for enrollment in the booking system. The user can dismiss the window through the close box in the upper right hand corner of the window.

A hand-cursor indicates that the user can click and drag to pan the live preview window. Keyboard and mouse shortcuts are also provided to allow easy zoom in/out of the live preview. Zooming in/out is performed on the live-preview video stream and will be translated accordingly to the full-resolution capture when the capture button is clicked.

Details of operation of the illustrative system will now be described. The system uses Microsoft .Net framework, and is generally used with a Canon Digital Rebel camera. After ensuring that the .Net framework version is installed, the user inserts the Canon product CD, selects "Easy Installation," accepts the license terms and restarts the computer. The mug shot acquisition application can then be installed from another CD. This straightforward installation process can generally be performed by an end-user, rather than a specialized technician.

Figure 15:
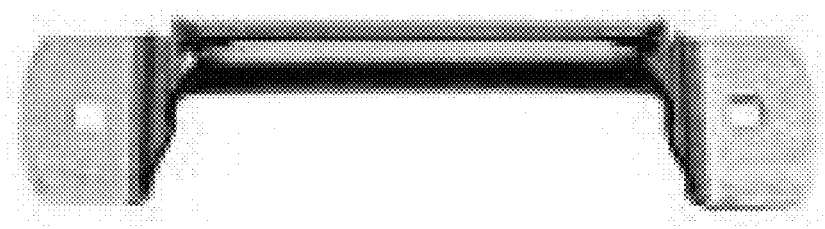
FIG. 15 is a side view of a camera mounting bracket for the illustrative mug shot acquisition system of FIG. 4.
Figure 16:
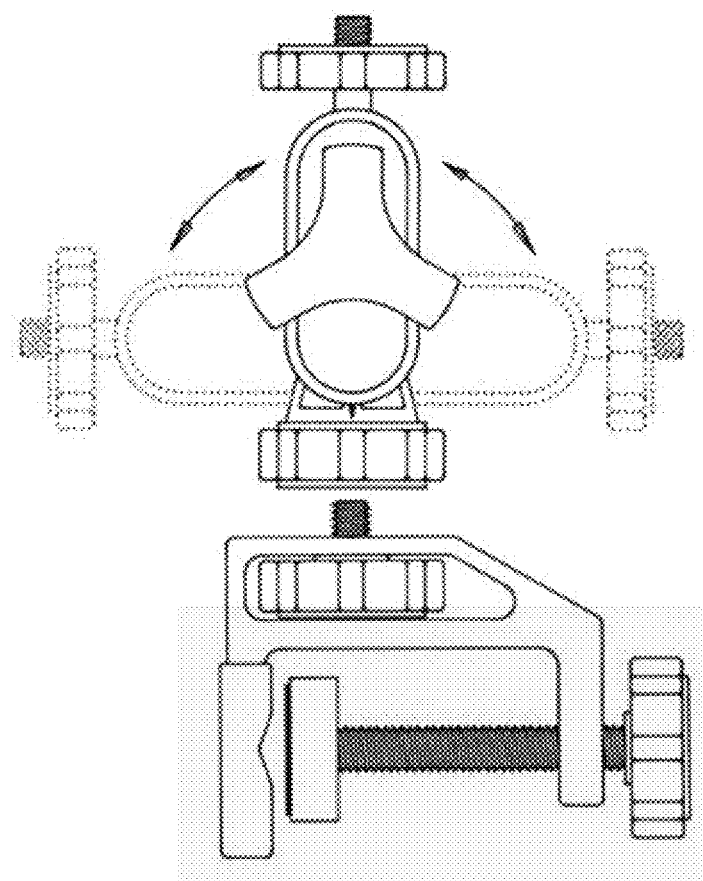
FIG. 16 is a side elevation view of a camera mounting bracket for the illustrative mug shot acquisition system of FIG. 4 with different mounting positions shown in phantom.

The user then selects a location, on a wall, booking desk or other suitable area, which is directly across from where the subject will be photographed. Ideally, the subject will be 3 to 4 feet from the wall/background and 4 feet from the lens of the camera. Once the location has been selected, the user mounts a camera mount base (FIG. 15) using two screws or bolts. A universal camera mount (FIG. 16) is then attached to the camera mount base. A U-shaped portion of the mount secures to the mount base. The user then screws the mount into the bottom of the camera and levels it accordingly using adjustment knobs.

The camera's power adapter is then set up and its USB interface is connected to the computer. No memory card is needed in the camera in this embodiment. The camera is then set to auto and turned on. This causes it to be recognized and allows it to be calibrated using the camera manufacturer's calibration software.

The user can then validate the exposure settings by pressing a camera icon. Validating the exposure is keyed to the background. To begin, the background is needed, which must be 18% gray with a plain smooth flat surface. Validation starts with the user positioning the background image and the camera in their expected locations. The camera should be set up as if taking a captured image, although the validation is specific to the background exposures, ideally an individual would be in the image to allow focus and balance on the camera to function correctly. Several areas of the camera image where only the background exists will be examined with the following requirements in mind:

The average of the RGB components within each area should be calculated; with each of the RGB means falling between 105 and 125, with a standard deviation of plus or minus 10.

The maximum difference between the means of any two of the RGB components should not exceed 10.

The image will only be truly valid when all of the requirements above are met. Test captures from the camera should be made to validate the settings. The camera settings, lighting and/or the background may need to be adjusted in order to fulfill these requirements. The validation process will provide feedback as to the issues encountered while trying to validate the test images.

Figure 17:
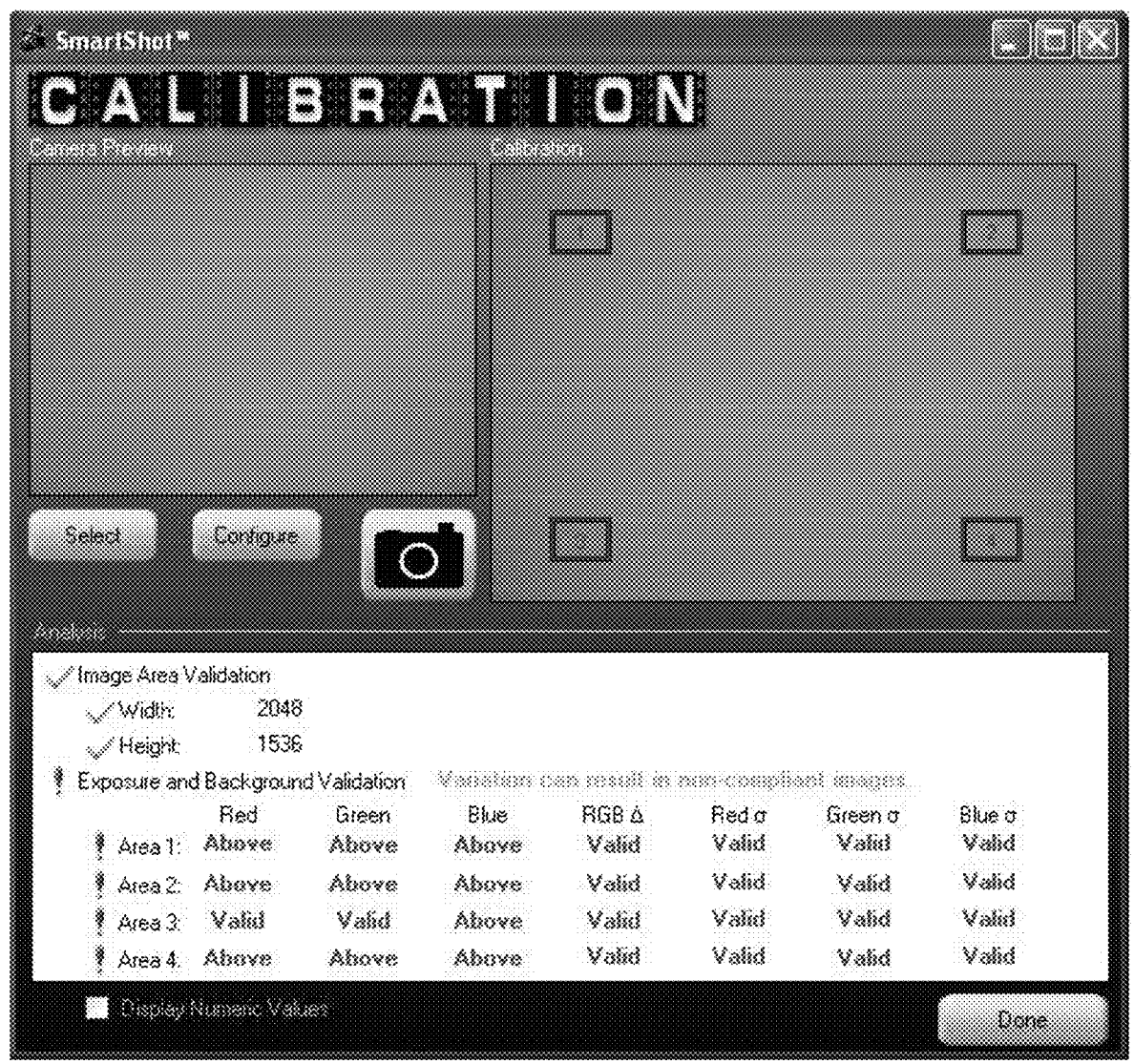
FIG. 17 is a calibration setup dialog for the illustrative mug shot acquisition system of FIG. 4.

Referring to FIG. 17, the user performs the validation by clicking and dragging each of four numbered boxes to various areas of the image. Each of the number boxes should be used to validate the corresponding quadrant of the image. For example, Box #1 would validate the upper left quadrant.

To fine-tune the image, the user can click on a configure button again. Usually, a valid image can be obtained by either reducing (−⅓) or increasing (+⅓) the exposure setting. Once the user has made a configuration change, he or she clicks an OK button. He or she can then press the camera button again to recapture/analyze the image. It is important to note that environmental considerations strongly impact the quality of the image. Most notable, are the lighting conditions of the booking area. The user should ensure that all light sources are appropriate and consistent (e.g., are the shades open consistently during the day?).

Figure 18:
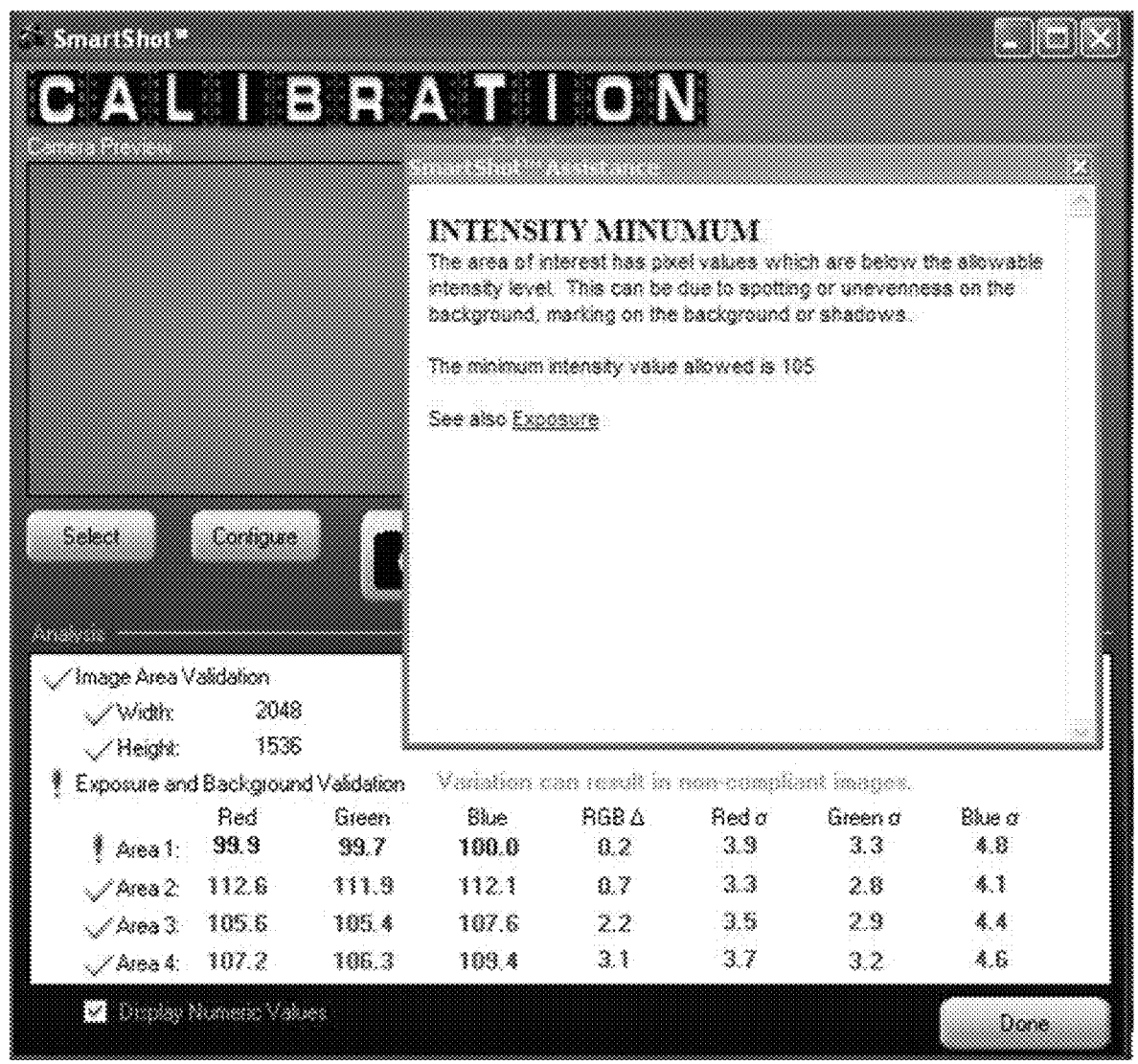
FIG. 18 is the calibration setup dialog of FIG. 17 showing an intensity minimum error message.
Figure 19:
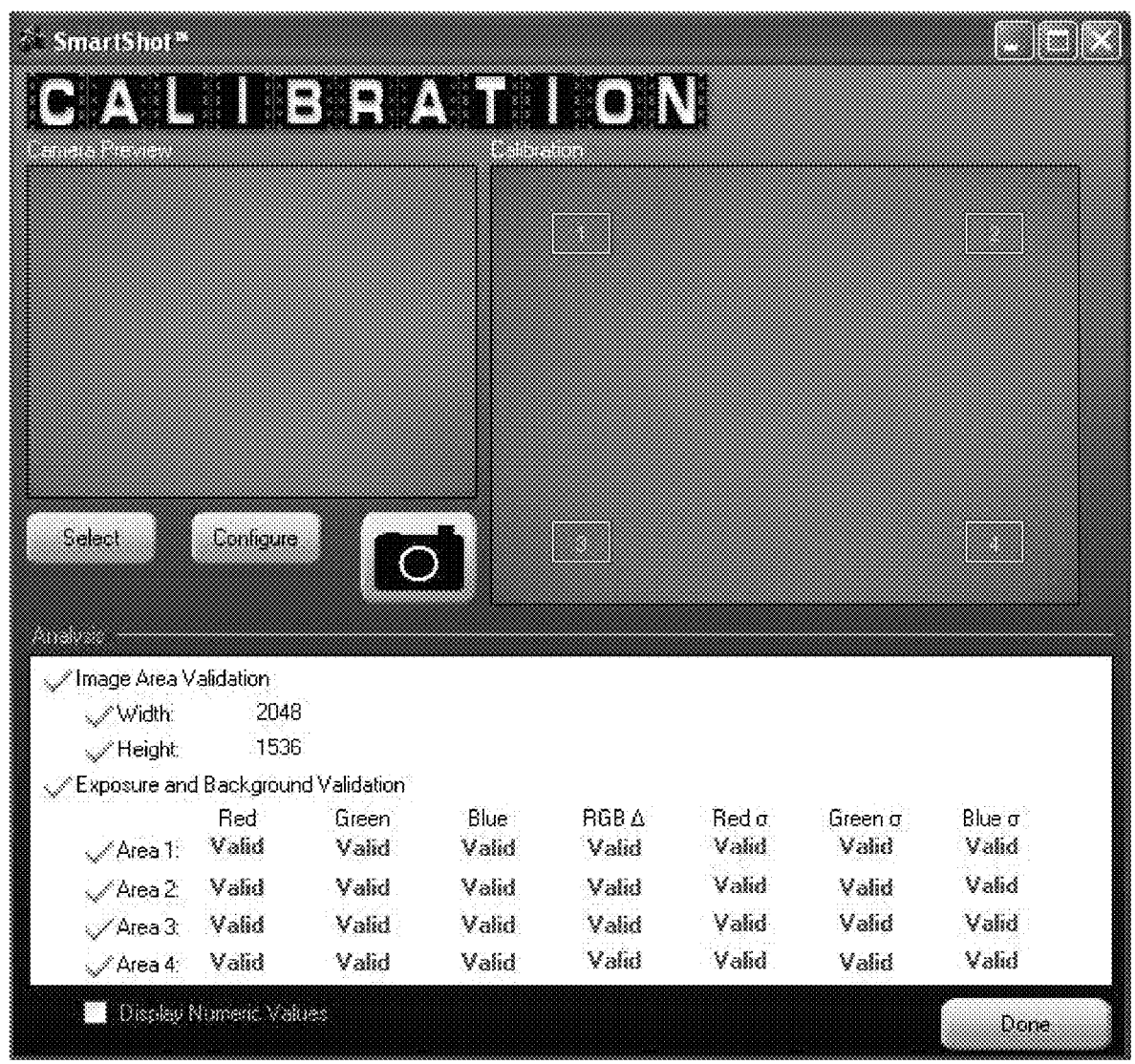
FIG. 19 is the calibration setup dialog of FIG. 17 showing a fully validated setup.

While it is optimal that all four quadrants be valid, in some booking environments, this may not be possible. The application will still take mug shot photos even if all four quadrants are not valid. During the calibration and configuration process, the user can click on a "display numeric values" check box to view the actual calibration results. Additional instructional information is available by clicking on a non-compliant value (see FIG. 18). The application also shows when the camera and environment are properly configured, by showing that there are four valid quadrants (see FIG. 19).

Figure 20:
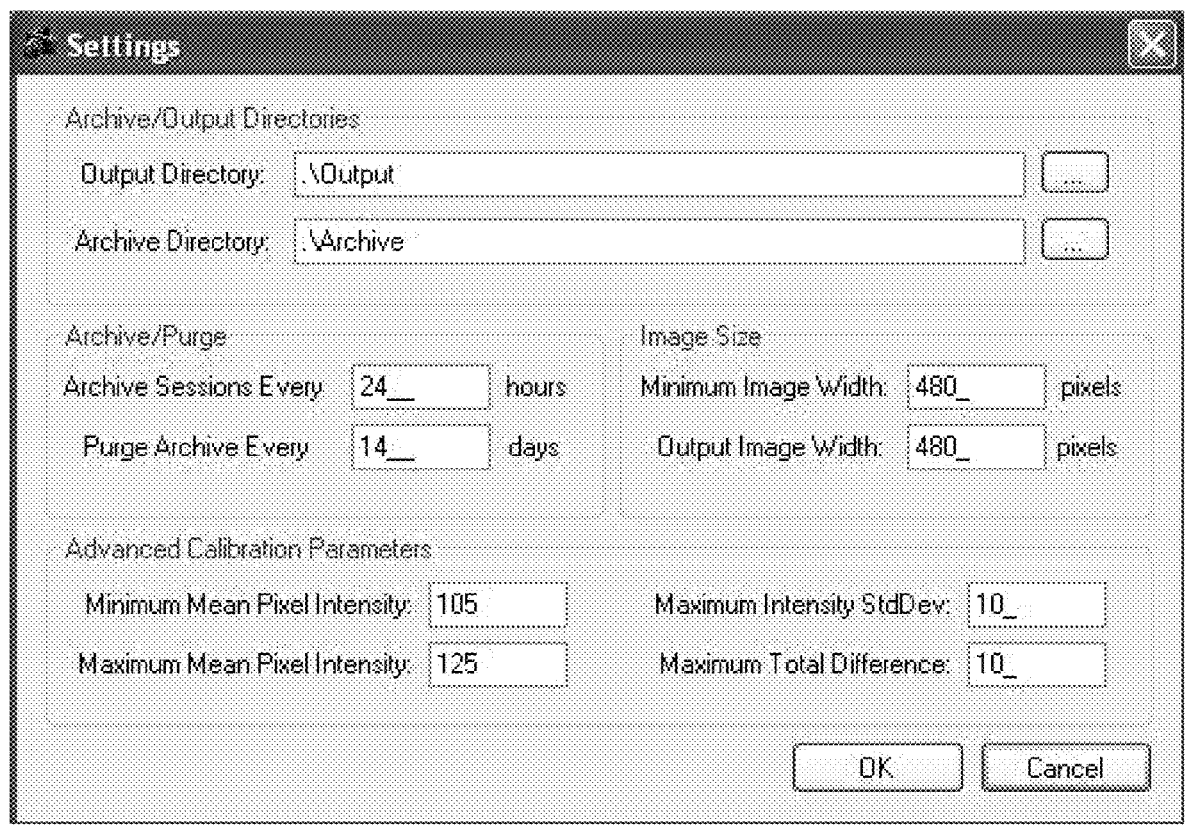
FIG. 20 is an application setup dialog for the illustrative mug shot acquisition system of FIG. 4.

Referring to FIG. 20, the user can then click on a settings button to configure the application settings. By default, many of the application settings will be appropriate for normal use. Settings include:

Output Directory: This is the location where session folders and images will be saved. To change the location, the user can click on the adjacent button with the three dots and navigate to the desired location. Note that this location can be a network drive.

Archive Directory: the application can automatically archives images after a specified period of time. The archive directory path dictates the location that archived images will be saved. To change the location, the user can click on the adjacent button with three dots and navigate to the desired location. Note that this location can be a network drive.

Archive Sessions Every: The user can specify the number of hours that should elapse before a session is archived. Upon startup, the application will review all previous sessions and move older sessions to the archive directory.

Purge Archive Every: Allows a user to specify the number of days that should elapse before archived sessions are purged.

Minimum Image Width: The default setting is 480 pixels; which is the NIST guideline.

Output Image Width: The default setting is 480 pixels; which is the NIST guideline.

Minimum Mean Pixel Intensity: The default setting is 105; which is the NIST guideline.

Maximum Mean Pixel Intensity: The default setting is 125; which is the NIST guideline.

After completing any changes, the user clicks an OK button, and the user can set up restricted user access, if necessary.

The user can then take a mug shot. When the application opens, a default session name will be created which is comprised of the current date and time (format: mmddyyyy_hhmm). Users can accept this default session name or modify the session name to their choosing. For example, the session name could be the name of a subject ("John Doe") or it could be changed to a subject id number ("123456789").

After changing or confirming the session name, the user can click a start session button. The Poses window will open which will allow the user to capture various images type. The application is pre-loaded with four pose types: Front, Right, Left and Other. The default pose is Frontal. With a subject standing in front of the camera, the application will automatically begin tracking on the subject's face and correctly frame the subject image based on NIST Best Practice Guidelines. The user can then click the camera icon to capture the image. This image capturing process can be repeated as desired and necessary. Note that the pose selection will automatically switch to "Right" and the tracking mode will switch to Manual. The Auto tracking mode is not available for any pose other than Frontal in this embodiment. With the tracking mode set to Manual, the user can click, drag and size the image capture window. This can be very useful when capturing scars, marks, tattoos or other images which fall outside of the normal Auto tracking parameters. Once the user has captured the desired images, he or she can click the review button in the lower right hand corner of the screen. In the review section, the user can click on each of the images on the left to for quality and accuracy. He or she may also rename or delete any of the images by right clicking a selected one. Once the user is satisfied with each of the images, he or she can click a save button in the lower right hand corner of the screen.

The present invention has now been described in connection with a number of specific embodiments thereof. However, numerous modifications which are contemplated as falling within the scope of the present invention should now be apparent to those skilled in the art. For example, systems according to the invention may also be applicable to other types of uniform photograph acquisition systems for people or objects, such as systems used for creating identity document or cataloging objects. Therefore, it is intended that the scope of the present invention be limited only by the scope of the claims appended hereto. In addition, the order of presentation of the claims should not be construed to limit the scope of any particular term in the claims.

What is claimed is:

1. A mug shot acquisition system for acquiring mug shot images of a subject posed in front of a background, including a processor and a storage device including instructions configured to run on the processor, comprising:
    an image acquisition interface operative to receive digital mug shot images from an imaging device that is positioned to acquire images of the subject posed in front of the background,
    a user interface presented on a display and responsive to system user input, including:
        a control to cause a mug shot image to be acquired by the imaging device,
        an image viewing display responsive to the image acquisition interface and operative to display the received digital mug shot images,
        one or more standards-based image adjustment software tools operative to provide feedback to the user about compliance of acquired images to at least one predetermined mug shot uniformity standard, and operative to prevent the user from exporting the digital mug shot images that fail to meet the predetermined mug shot uniformity standard, and to allow the user to adjust the digital mug shot images to meet the predetermined mug shot image uniformity standard,
    a software interface constructed to allow a transfer of control to the mug shot acquisition system from another application that is running on an operating system platform and wherein the software interface also includes a user interface presented on the same display and also responsive to system user input, and
    an image export interface operative to export digital mug shot images adjusted based on the standards-based image adjustment software.

2. The apparatus of claim 1 wherein the system further includes storage for machine-readable standards and wherein the standards based-image adjustment software tools include at least one tool that automatically applies a standard.

3. The apparatus of claim 1 wherein the standards-based image adjustment software tools include standards compliance display indicators that are operative to indicate a degree of compliance of an image with at least one predetermined standard.

4. The apparatus of claim 1 wherein the standards-based image adjustment software tool includes a background calibration tool operative to apply at least one predetermined standard to a background against which a digital mug shot image is to be acquired.

5. The apparatus of claim 4 wherein the background calibration tool is operative to evaluate a background for uniformity of illumination against a predetermined standard for uniformity of illumination and is operative to present an indication of compliance to the standard to the user.

6. The apparatus of claim 5 wherein the background calibration tool is operative to provide at least one spatial indicator to convey spatial information about non-uniformity of illumination.

7. The apparatus of claim 4 wherein the background calibration tool is operative to apply at least one predetermined image color content standard to the digital mug shot images.

8. The apparatus of claim 1 wherein the standards-based image adjustment software is operative to apply at least one predetermined pixel-size standard to the digital mug shot images.

9. The apparatus of claim 1 wherein the standards-based image adjustment software tools include an exposure validation tool operative to validate an exposure level for at least one digital mug shot image according to a predetermined standard.

10. The apparatus of claim 9 wherein the exposure validation tool is operative to detect hot spots and shadows.

11. The apparatus of claim 1 wherein the standards-based image adjustment software tools include a framing tool.

12. The apparatus of claim 11 wherein the framing tool provides automated assistance to a system user in framing the face, head, and shoulders according to a predetermined standard.

13. The apparatus of claim 11 wherein the framing tool is operative to provide at least one on-screen movable image alignment reference that is operative to be displayed in the image viewing display at the same time as is a digital mug shot image.

14. The apparatus of claim 13 wherein the framing tool includes automatic subject tracking logic operative to automatically position the at least on reference relative to at least one anatomical feature of the mug shot subject.

15. The apparatus of claim 11 wherein the framing tool includes manual guide positioning logic responsive to user input to manually position the at least one reference relative to the at least one anatomical feature of the mug shot subject.

16. The apparatus of claim 11 wherein the framing tool is operative to provide references for a width, a horizontal mid-point, and an eye level of a subject face.

17. The apparatus of claim 1 wherein the image acquisition interface is a universal interface that is operative to acquire digital mug shot images from different types of image sources.

18. The apparatus of claim 17 wherein the image acquisition interface is operative to interface with still image cameras and video cameras.

19. The apparatus of claim 1 wherein the image acquisition interface is operative to convey an acquisition triggering control to the image source while an image received from the interface is being displayed on the image viewing display.

20. The apparatus of claim 1 wherein the display includes a window in a larger display device associated with a general-purpose computer.

21. The apparatus of claim 1 wherein the standards-based image adjustment software tools include a depth-of-field validation tool operative to apply a predetermined depth of field standard to the digital mug shot images.

22. The apparatus of claim 1 wherein the image acquisition interface is responsive to one or more image acquisition controls displayed in the display.

23. The apparatus of claim 1 wherein the image acquisition interface is a digital camera interface and includes a digital camera cable and wherein the system further includes a digital camera mount within range of the digital camera cable.

24. The apparatus of claim 1 further including user interface logic operative to display a pose selection control, a capture control, and a camera window in the display.

25. The apparatus of claim 24 wherein the user interface logic is further operative to display a thumbnail icon area that presents icons that each correspond to different types of mug shot images.

26. The apparatus of claim 1 wherein the software interface is responsive to a launch command to launch the mug shot acquisition system.

27. The apparatus of claim 26 wherein the software interface is responsive to the launch command together with at least one parameter.

28. The apparatus of claim 1 wherein the software interface is constructed to allow a transfer of control that does not provide any significant cue that different programs are being used.

29. The apparatus of claim 1 wherein the software interface is constructed to allow a transfer of control from a records management system.

30. A mug shot acquisition system for acquiring mug shot images of a subject posed in front of a background, including a processor and a storage device including instructions configured to run on the processor, comprising:

means for receiving digital mug shot images from an imaging device that is positioned to acquire images of the subject posed in front of the background, user interface means presented on display means and responsive to a system user to cause the imaging device to acquire an image, means for displaying the received digital mug shot images, standards-based image adjustment means for providing feedback to the user about compliance of acquired images to at least one predetermined mug shot image uniformity standard and for allowing the user to adjust the digital mug shot image uniformity standard, means for preventing the user from exporting an acquired digital image that fails to meet the predetermined mug shot image uniformity standards by the mug shot acquisition system, means responsive to software requests to allow a transfer of control to the mug shot acquisition system from another application that runs on an operating system software program and also includes a user interface presented on the display means and also responsive to the system user input, and means for exporting digital mug shot images adjusted based on the standards-based image adjustment means.

31. A mug shot acquisition method for acquiring mug shot images of a subject posed in front of a background, including:

providing an operating system software platform including instructions configured to run on a processor, running a law enforcement record management system on the operating system platform, responding to user input to launch a mug shot acquisition system on the same operating system platform from within the law enforcement record management system, acquiring a first digital mug shot image of the subject posed in front of the background by an image acquisition interface after the step of responding, providing feedback by the mug shot acquisition system to the user about compliance of the acquired image with one or more predetermined mug shot image uniformity standards, preventing the user from exporting an acquired digital image that fails to meet the predetermined mug shot image uniformity standards by the mug shot acquisition system, adjusting by the mug shot acquisition system attributes to improve the compliance to the mug shot uniformity standards for the digital image in response to user input after the step of providing feedback, exporting an acquired digital image for which one or more attributes has been adjusted and which meets the predetermined mug shot uniformity standards, and returning control to the law enforcement record management system running on the operating system platform after the step of exporting.

32. The method of claim 31 further including the step of acquiring a second image of the subject posed in front of the background after the step of adjusting and wherein the step of exporting exports the second image.

* * * * *